United States Patent [19]

Chen

[11] Patent Number: 5,739,907
[45] Date of Patent: Apr. 14, 1998

[54] LASER INTERFERENCE DISPLACEMENT MEASURING SYSTEM CAPABLE OF AUTOMATIC LASER PATH ALIGNMENT

[76] Inventor: Jenq-Shyong Chen, No. 64-5, San Hsing Tsun, Ming Hsiung Hsiang, Chia I Hsien, Taiwan

[21] Appl. No.: 753,297

[22] Filed: Nov. 22, 1996

[51] Int. Cl.⁶ .................................................. G01B 9/02
[52] U.S. Cl. .................................. 356/358; 358/345
[58] Field of Search .......................... 356/345, 358, 356/356

[56] References Cited

U.S. PATENT DOCUMENTS 4,707,129  11/1987  Hashimoto et al. ............... 356/358
4,714,339  12/1987  Lau et al. ............................ 356/358
5,013,152   5/1991  Crownshaw ........................ 356/358

Primary Examiner—Frank G. Font
Assistant Examiner—Robert Kim
Attorney, Agent, or Firm—Browdy and Neimark

[57] ABSTRACT

A laser interference system comprises a laser head, an interference lens, a reflector, an optic fiber transmission set, and an automatic laser path alignment unit having a photodiode, a data processing member and a control member. The photodiode is capable of sensing the position of the reflecting residual light of the reflector. The output signal of the position of the reflecting residual light is processed by the data processing member to become the electric voltage, which is transmitted to the control member for regulating the relative lateral displacement between the interference lens and the reflector.

7 Claims, 4 Drawing Sheets

LASER INTERFERENCE DISPLACEMENT MEASURING SYSTEM CAPABLE OF AUTOMATIC LASER PATH ALIGNMENT

FIELD OF THE INVENTION

The present invention relates generally to a laser measuring system, and more particularly to a laser interference displacement measuring system having automatic laser path alignment.

BACKGROUND OF THE INVENTION

As shown in FIG. 1, the laser interferometer is generally intended for use in testing the machine tool as well as the coordinate measuring machine and is composed of a laser head 1 mounted on a tripod, and interference lens 2 located at a reference position, and a reflector device 3 mounted on a moving object. In operation, when the relative displacement takes place along the optical axis between the interference lens 2 and the reflector 3, the Doppler-shift effect is brought about on the interference lens 2. As a result, the relative displacement distance on the optical axis between the interference lens 2 and the reflector 3 can be attained by calculating the Doppler-shift effect, thereby measuring the displacement of the moving slide. The lens set used for testing the displacement error is different from the lens sets used for testing the angle error, straightness error and squareness error. Before the execution of measurement, the laser head, the interference lens and the reflector are manually aligned such that the test axial motion path of the moving slide is parallel to the laser path, and that the cross axial displacement of the moving slide perpendicular to the laser path is averted. The alignment is intended to make sure that the laser power is transmitted from the reflector to the interference lens with precision.

The conventional laser interferometer described above has inherent shortcomings, which are expounded explicitly hereinafter.

The alignment of the laser head, the interference lens and the reflector can not be easily attained with precision and is a time-consuming task. In addition, different sets of the lenses are required for testing the displacement error, the angle error, straightness error and squareness eror. Moreover, the lens alignments must be done separately for testing the horizontal axis error and the vertical axis error. As a result, several working days are needed to complete the geometry testing of a machine tool.

The laser device is mounted on a tripod, which takes up a large floor space. As a result, the test can not be easily carried out in a place where the floor space is rather limited.

Machine operator must be protected with a machine cover, which often obstructs the laser path between the laser head and the interference lens.

Even though the conventional laser interferometer is capable of diagonal measurement, its alignment work is rather complicated and time-consuming.

SUMMARY OF THE INVENTION

It is therefore the primary objective of the present invention to provide a laser interference displacement measuring system capable of automatic laser path alignment, which can be set up easily.

It is another objective of the present invention to provide a laser interference displacement measuring system, which does not take up a large floor space.

It is still another objective of the present invention to provide a laser interference displacement measuring system, which is free from the problem of the obstruction of the laser path by the machine cover intended to protect the machine operator.

In keeping with the principle of the present invention, the foregoing objectives of the present invention are attained by a laser interferometer for measuring the linear displacement, which comprises a laser head, an interference lens, a reflector, an optic fiber transmission set, and an automatic laser path alignment unit provided with a photodiode, a data processing member and a control member. The photodiode is capable of sensing the position of the reflecting residual light of the interference lens. The output signal of the position of the reflecting residual light is processed by the data processing member to become the electric voltage, which is transmitted to the control member for regulating the relative displacement between the interference lens and the reflector.

The foregoing objectives, features and functions of the present invention will be more readily understood upon a thoughtful deliberation of the following detailed description of a preferred embodiment of the present invention in conjunction with the accompanying drawings.

DETAILED DESCRIPTION OF THE INVENTION

Figure 1:
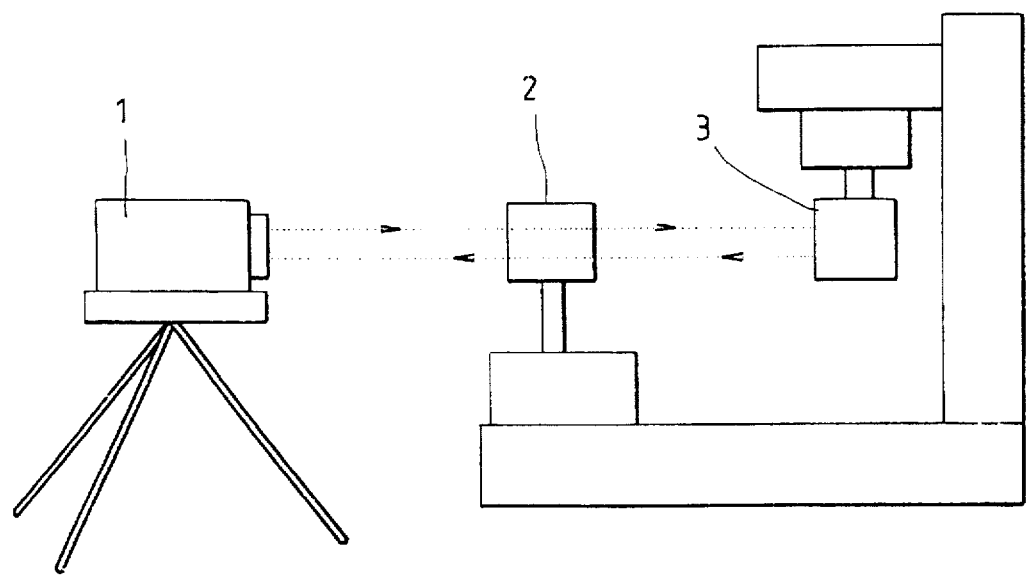
FIG. 1 shows a simplified view of a laser interferometer of the prior art.
Figure 2:
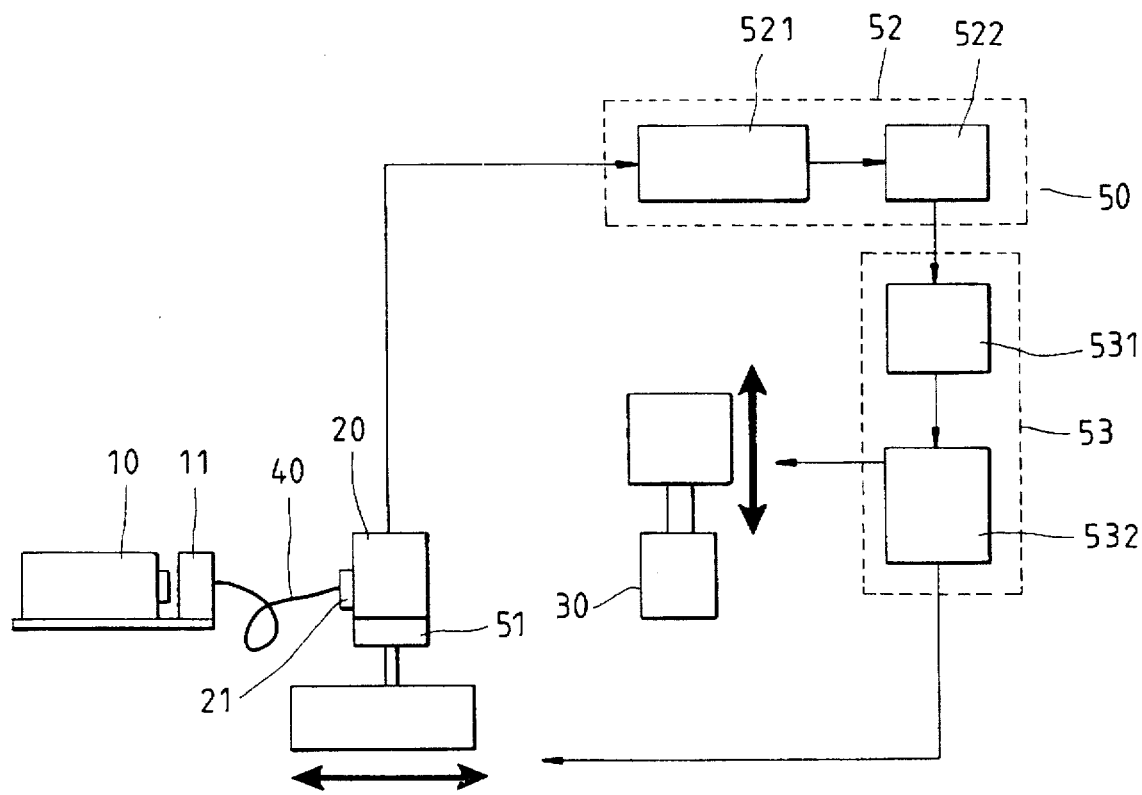
FIG. 2 shows a schematic view of the preferred embodiment of the present invention.
Figure 3:
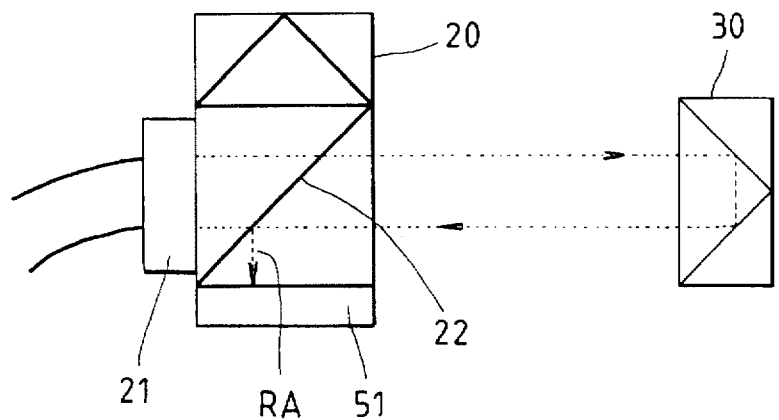
FIG. 3 shows a schematic view of the laser path between the interference lens and the reflector of the present invention.
Figure 4:
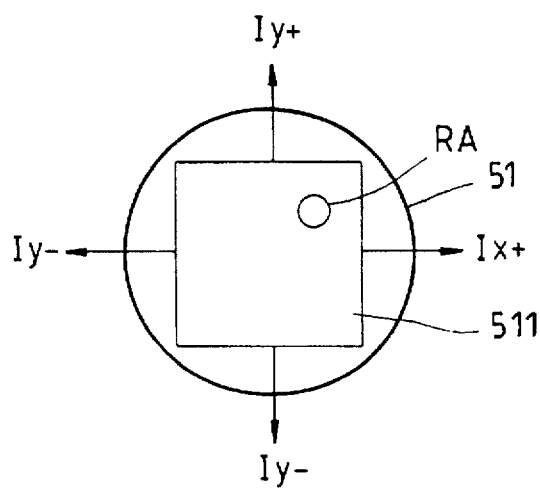
FIG. 4 is a schematic view showing the projection of the residual laser beam on the photodiode of the present invention.

As shown in FIGS. 2 and 3, a laser interferometer gauge embodied in the present invention is composed of a laser head 10, an interference lens 20, a reflector 30, an optic fiber transmission set 40, and an automatic laser path alignement unit 50.

The laser head 10 is composed of a transceiver for transmitting and receiving the laser beam, and a fastening clamp 11 attached to an outer end thereof. The interference lens 20 is provided at the outer end thereof with a fastening clamp 21 attached thereto. The optic fiber transmission set 40 is fastened at one end thereof with the fastening clamp 11 of the laser head 10 and at other end thereof with the fastening clamp 21 of the interference lens 20. As a result, the transmission of laser beam between the laser head 10 and the interference lens 20 is attained by the single mode optic fiber capable of minimizing the dispersion effect so as to secure the phase or coherence of the laser beam. In addition, the single mode optic fiber of the optic fiber transmission set 40 is capable of maintaining the polarization. For this reason, it is necessary to alter only the relative positions and directions of the interference lens 20 and the reflector 30 so as to facilitate the measuring of different errors.

The automatic laser path alignment unit 50 is composed of a photodiode 51, a data processing member 52, and a control member 53. The photodiode 51 is located at the bottom of the interference lens 20 for receiving the reflecting residual light ($R_A$) of the laser photopoints on the interference lens 20, as shown in FIG. 3. The photodiode 51 is a guadrant photodiode or dual-axis lateral effect photodiode, which has a sensing surface 51 and four current output pins ($I_{x+}$, $I_{x-}$, $I_{y+}$, $I_{y-}$). The projection positions of the laser photopoints are detected by the sensing surface 511 so as to generate the current of a determinate magnitude. As a result, the output current flows of the current output pins ($I_{x+}$, $I_{x-}$, $I_{y+}$, $I_{y-}$) are dependent proportionally on the distance between the laser photopoints and the circuit connection points. The data processing member 52 has a signal amplifier 521, and an A-D (analog-digital) converter 522. The output currents of the photopoint positions sensed by the photodiode are amplified and converted into four voltage values which are changed linearly along with the different positions of the laser photopoints. The deviation distance of the laser beam is calculated on the basis of the output voltage values of the photodiode. The control member 53 is composed of a microcomputer 531 and a CNC controller 532 and is intended for use in converting the output voltage values into the lateral displacements of the laser positions as well as the displacement instructions which are transmitted to the CNC controller 532 to drive the moving axes of the machine tool, so as to attain the automatic alignment of the laser beam paths between the interference lens and the reflector.

Figure 5:
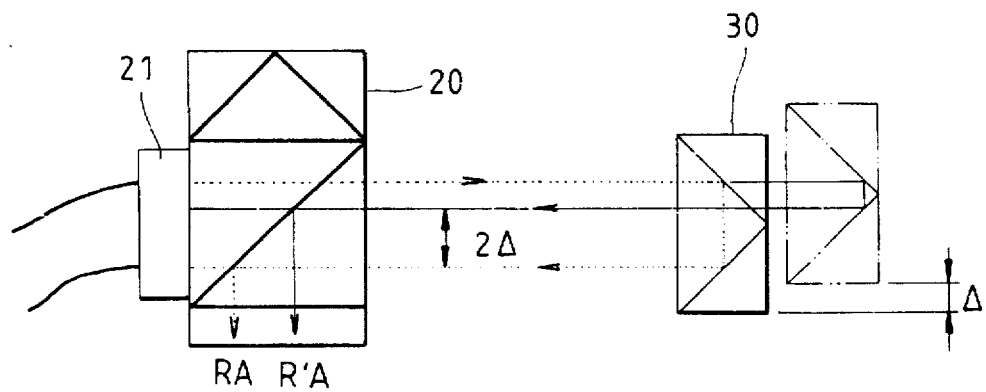
FIG. 5 is a schematic view illustrating the change in the position of the residual laser beam at such time when the change in displacement between the interference lens and the reflector of the present invention takes place.

As illustrated in FIG. 5, the reflecting residual light is $R_A$ when the reflector 30 and the interference lens 20 are in the initial state. If any lateral displacement Δ of the reflector 30 and the interference lens 20 takes place, the new residual light RA' projected on the photodiode 51 has the displacement 2 Δ. In the meantime, the four current output pins ($I_{x+}$, $I_{x-}$, $I_{y+}$, $I_{y-}$) will increase or decrease proportionally. Through the data processing member 52, they are converted into the output voltage values. Through the control member 53, the correction is made in accordance with the alignment operation so as to carry out the measuring operation.

Figure 6:
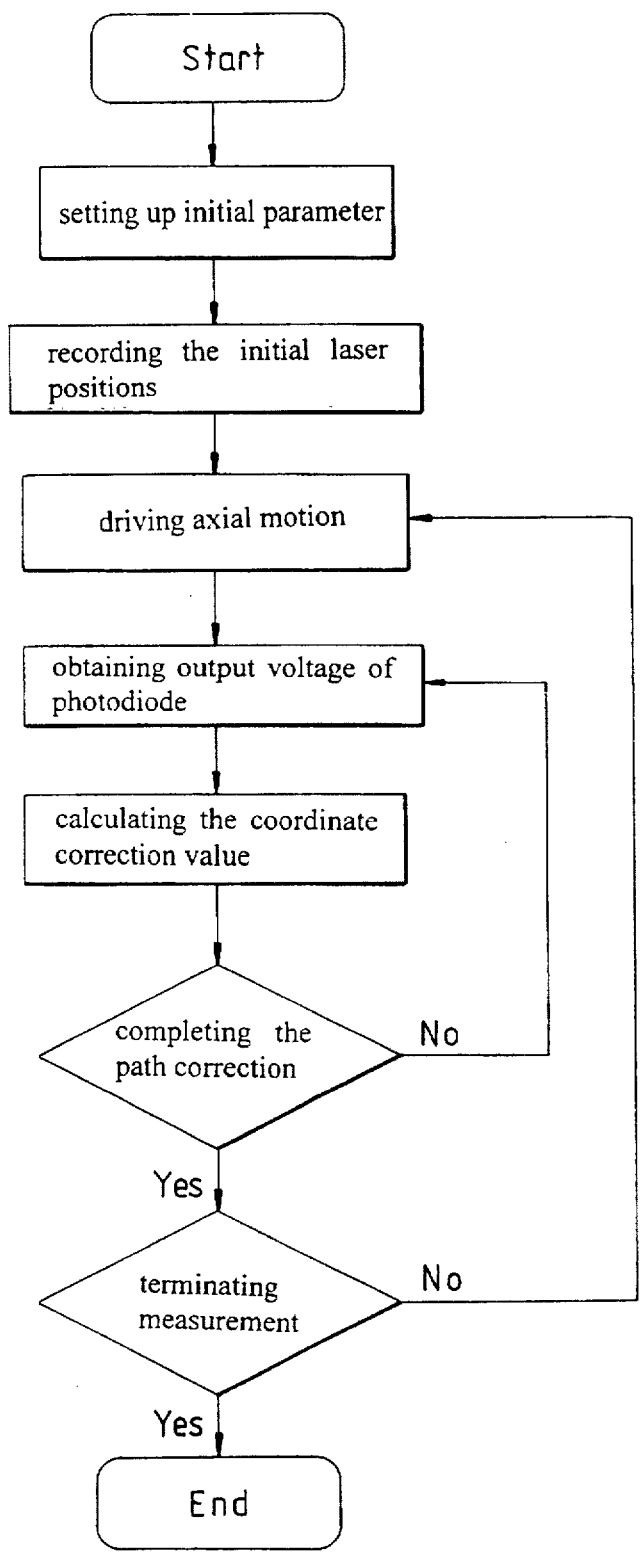
FIG. 6 is a flow chart illustrating the present invention at work.

As shown in FIG. 6, the initial position of the initial laser point on the photodiode is recorded. When the main axis is in motion, the lateral displacement relative to the laser axis is brought about by the interference lens 20 and the reflector 30, thereby resulting in the new current value brought about by the new residual light RA' on the photodiode 51. Through the data processing member 52, they are converted into the voltage values, which are transmitted to the control member 53 for conversion into the motion instruction of the driven axes so as to correct the relative lateral displacements of the interference lens 20 and the reflector 30 by the control device until such time when the position of the new residual light RA' on the photodiode has returned to the initial position to complete the automatic alignment of the laser paths.

Figure 7:
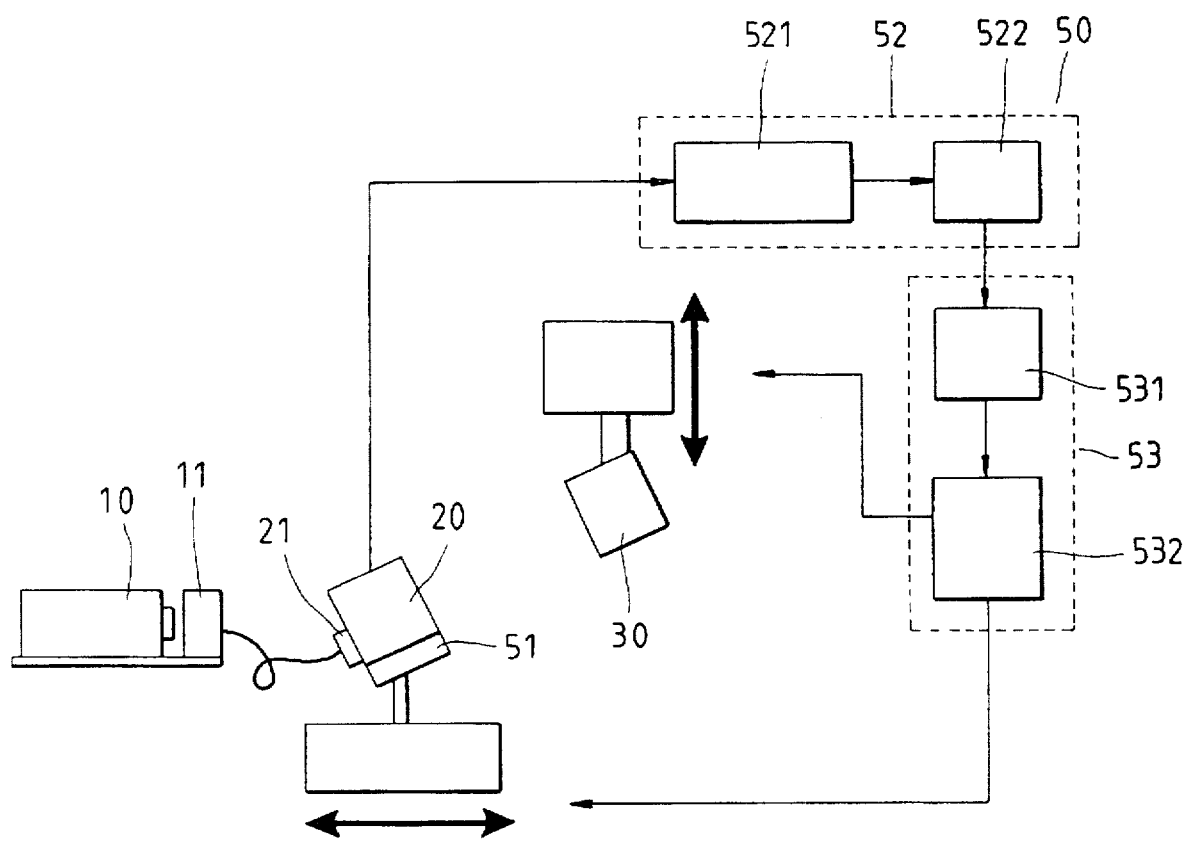
FIG. 7 is a schematic view illustrating the present invention at work for diagonal measurement.

As shown in FIG. 7, the present invention can be used to test not only the single axis linear displacement measurement but also the multiaxis diagonal measurement. In addition, machine geometric errors such as straightness, angular error and squareness can be easily calculated from combined diagonal measurements, without having to use various interference lenses or reflectors or to align the laser path repeatedly.

To sum up, the present invention has inherent advantages over the conventional laser interferometer in that the present invention makes use of the optic fiber transmission member to simplify the alignment of the laser beam paths of the laser head and the interference lens, and that the alignment of the interference lens and the reflector is eliminated, thanks to the photodiode of the interference lens and the closed loop controls of the data processing member and the control member, and further that the present invention can be easily set up on a limited floor space, and still further that the present invention is capable of automatic measurement of multi-axial displacement error.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A laser interference system for measuring displacement, said system comprising:
    a laser head;
    an interference means;
    an optic fiber transmission member for transmission and reception of laser beam between said laser head and said interference means; and
    an automatic laser path alignment unit comprising a photodiode, a data processing member and a control member, said photodiode being located at a lower end of a reflecting residual light of said interference means, said photodiode having a sensing surface for sensing a reflecting residual light position brought about on said interference means by a laser beam source, said data processing unit being intended for converting an output signal of said residual light position into a voltage value, which is transmitted to said control member for regulating relative displacement between said interference means and a reflector.

2. The system as defined in claim 1, wherein said photodiode is a quadrant photodiode capable of forming a current output upon sensing said reflecting residual light position.

3. The system as defined in claim 1, wherein said photodiode is a dual-axis lateral effect photodiode capable of forming a current output upon sensing said reflecting residual light position.

4. The system as defined in claim 1, wherein said data processing member is composed of an amplifier and an A/D converter and connected with an output end of said photodiode.

5. The system as defined in claim 1, wherein said control member is composed of a microcomputer and a controller of a machine be tested and is connected with an output end of said data processing member.

6. The system as defined in claim 1, wherein said optic fiber transmission member comprises a single mode optic fiber capable of maintaining polarization.

7. The system as defined in claim 1, wherein said laser head and said interference means are provided respectively with a fastening clamp for holding securely said optic fiber transmission member.

\* \* \* \* \*